June 28, 1966   J. J. SPYTEK   3,257,716
SEAL REMOVING DEVICE
Filed Nov. 27, 1964
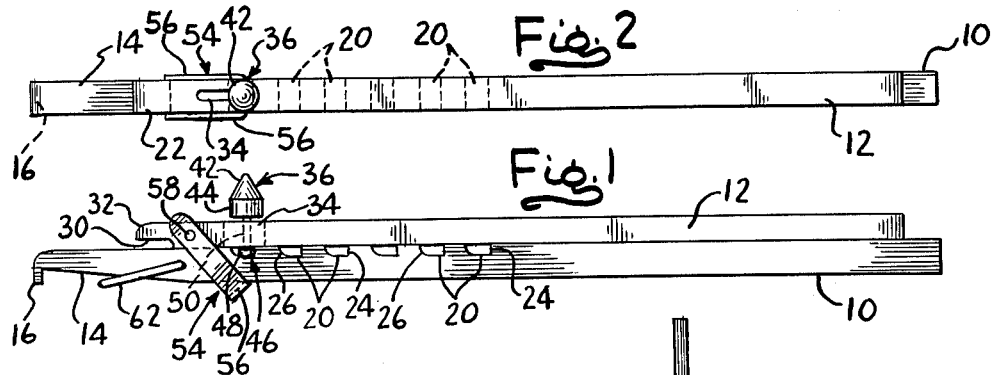
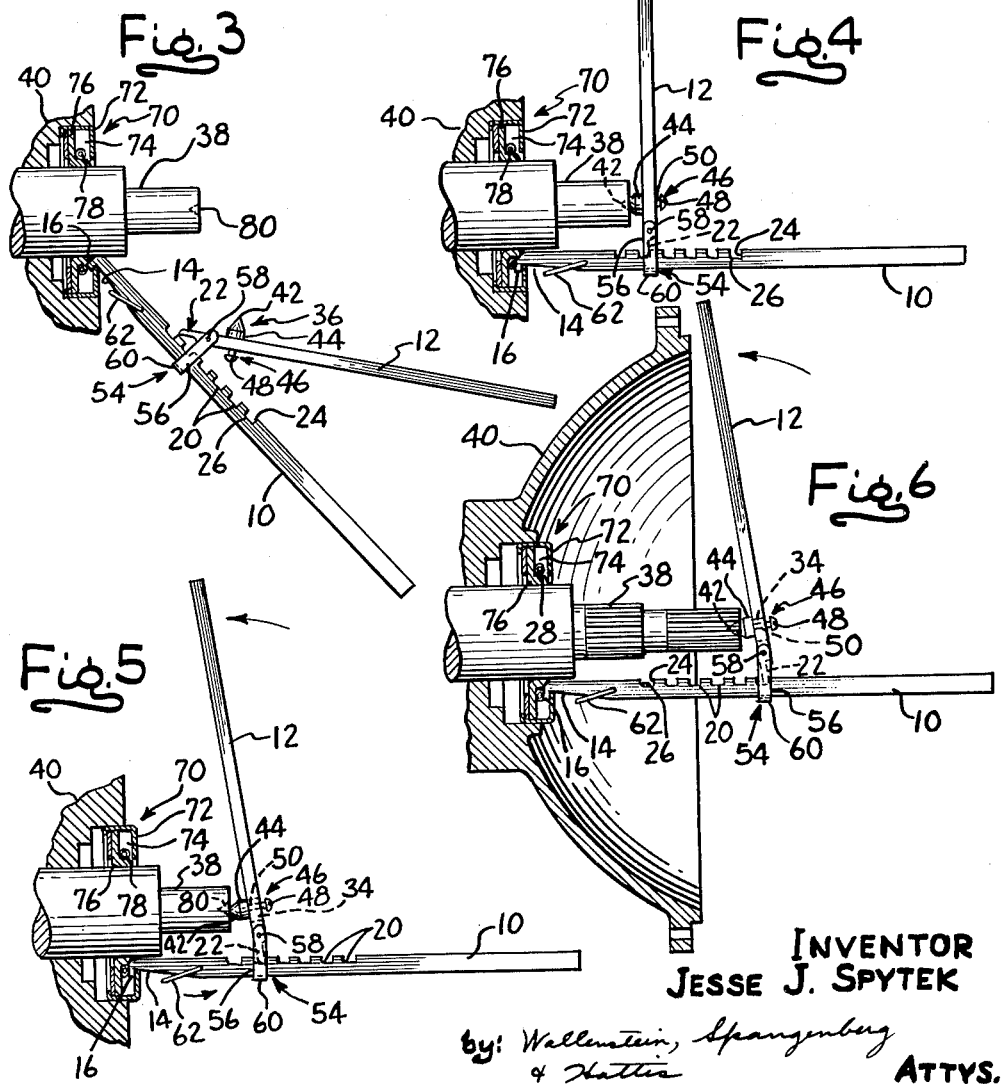
INVENTOR
JESSE J. SPYTEK
ATTYS.

United States Patent Office 3,257,716
Patented June 28, 1966

3,257,716
SEAL REMOVING DEVICE
Jesse J. Spytek, 3048 N. Haussen St., Chicago, Ill.
Filed Nov. 27, 1964, Ser. No. 414,322
4 Claims. (Cl. 29—267)

The present invention relates to a seal removing device having particular utility for extracting the seals carried by the housing of a motor vehicle of a transmission.

Automobile transmissions as presently manufactured usually are provided with a front or pump shaft seal and a rear or tail shaft seal which are press-fitted into the housing of the transmission and seal shafts against leakage of fluids, carried internally of the transmission, around such shafts. With use, the seals, particularly the front or pump shaft seal, of the transmission can develop leaks, necessitating their removal and replacement. Heretofore, removal of a defective seal from the housing generally involved wedging the blade of a screwdriver, for example, behind the sealing member of the seal and then forcing the seal from the housing. A hammer was frequently used to assist in this operation. The necessity for repeatedly changing the position of the blade of the screwdriver in order to pry the seal from the housing was difficult and time consuming, and the need for a hammer often resulted in damage to other, adjacent parts of the transmission.

In accordance with the present invention there is provided a device which enables seals such as those carried in the housing of a transmission to be removed quickly and with a minimum of effort on the part of the operator. Briefly, the device of this invention comprises an extracting rod having a downwardly extending seal engaging extension or hook portion at an end thereof. The extracting rod is provided with a plurality of longitudinally spaced notches for receiving an end of a lever. The lever carries a shaft engaging spindle or spur which forms, with the end of the shaft, a fulcrum for the lever. The spindle or spur advantageously is adjustable in a longitudinal slot in the lever to enable the device to be utilized in removing seals from transmissions having shafts of different diameters. The lever desirably also carries a pivotal retaining member which engages the extracting rod and acts to maintain the extracting rod engaging end of the lever in a selected one of the notches of the extracting rod as the lever is moved about its fulcrum in removing a seal from the housing of a transmission. The device is simple to operate and can be used to remove seals from the transmissions of a wide variety of passenger vehicles and trucks. In addition, the device is of rugged, long-lasting construction and can be inexpensively manufactured from standard bar steel stock.

In order that the invention may be fully understood, reference will now be made to the drawings wherein an exemplary embodiment of the device is illustrated, it being understood, however, that variations in construction may be made without departing from the scope of the invention except as defined by the appended claims.

In the drawing, FIG. 1 is a side view in elevation of an embodiment of the seal removing device;

FIG. 2 is a top plan view of the device illustrated in FIG. 1;

FIGS. 3, 4 and 5 are fragmentary side views in elevation, partly in section, showing various stages in the removal of a seal from a transmission housing utilizing the device shown in FIG. 1; and FIG. 6 is a fragmentary side view in elevation, partly in section, illustrating the use of the device shown in FIG. 1 in removing a seal from a transmission housing of the bell-type.

Referring now in particular to FIGS. 1 and 2 of the drawing, the embodiment of the device illustrated comprises an extracting rod 10 and a lever 12 both desirably fabricated from high carbon bar steel stock. The rod 10, at one end, advantageously is reduced for a portion of its length to provide a wedge-shaped neck portion 14 which is joined to a downwardly extending seal engaging hook portion 16. A plurality of longitudinally spaced notches 20 are formed in the upper surface of the rod 10 for receiving a reduced end 22 of the lever 12. The notches 20, as viewed in FIG. 1, each are provided with a substantially vertical rear wall 24 and a forward wall 26 having a radius. Correspondingly, the end 22 of the lever 12 has a substantially horizontal lower wall 30 for engaging the wall 24 of any selected notch 20, while at its upper, outermost edge 32, the end 22 desirably has a radius to enable the lever 12 to be pivoted through a greater distance when the end 22 is engaged in a notch 20 and the lever 12 is moved about its fulcrum.

The lever 12 advantageously has a longitudinal slot 34 proximal to the end 22 thereof in which is carried an adjustable fulcrum forming spindle or spur 36 for engaging an end of a shaft 38 associated with a transmission housing 40, see FIGS. 3-6. The spur 36 desirably comprises a conically shaped head portion 42 joined to a substantially cylindrical base portion 44. The spur 36 is adjustably carried in the slot 34 by means, for example, of a bolt or screw 46 having a slotted head 48 with a diameter greater than the width of the slot 34 and a threaded shank 50 which is secured for a portion of its length in a tapped bore in the base portion 44 of the spur 36. The shank 50 has a diameter less than the width of the slot 34 to permit free longitudinal movement of the spur 36 with relation to the slot 34. The adjustability of the spur 36 effectively enables the device of the present invention to be utilized most efficiently in removing seals from transmission housings having shafts of different diameters.

In order to prevent disengagement of the end 22 of the lever 12 from a selected notch 20 in the extracting rod 10, a retaining member advantageously is provided for the device. In the embodiment of the device illustrated, the retaining member comprises a substantially U-shaped yoke 54 having a pair of arms 56—56, desirably pivotally secured to the lever 12 by a pin or rivet 58 at a point adjacent the reduced end 22 thereof. The arms 56—56 of the yoke 54 are joined to an extracting rod engaging crossbar 60. The length of the arms 56—56 should be such as to retain the end 22 in a notch 20 throughout the movement of the lever 12 about its fulcrum during a seal removing operation. A bale or hanger 62, fabricated of heavy gauge wire, is provided for the device to enable it to be hung on a wall, for example, when not in use.

Referring now in particular to FIGS. 3 through 5 of the drawing, the use of the seal pulling device of the present invention in removing a seal 70 from a transmission housing is sequentially illustrated. The seals utilized in transmission housings vary considerably in construction. Generally speaking, they comprise a metal ring which carries a rubber or composition sealing member for engaging in fluid tight relation the outer surface of the drive shaft. The seal 70 illustrated in the drawing is typical of a kind used in a number of automotive transmissions and consists of a metal ring or housing 72 defining an annular channel 74. A rubber sealing member 76 is positioned in the channel and is urged into fluid tight engagement with the drive shaft 38 by a spring 78.

As shown in FIG. 3, the hook portion 16, joined to the wedge-shaped neck portion 14 of the extracting rod 10, is first urged between the outer wall of the drive shaft 38 and the sealing member 76. The extracting rod 10 is then moved upwardly toward the drive shaft in which position the hook portion 16 firmly engages the outermost wall of the metal housing 72 of the seal 70, see FIG. 4. The end 22 of the lever 12 thereafter is engaged in one of the notches 20 in the extracting rod 10. The selection of the notch to be used will be determined by the distance from the seal 70 to the end of the drive shaft 38. The head 42 of the spur 36 then is positioned in a correspondingly shaped bore 80 in the end of the shaft 38 to form a fulcrum for the lever 12. The yoke 54 moves with the lever 12 as these various adjustments are being made and can, therefore, be characterized as being self-positioning. With the device in the position shown in FIG. 4, the lever 12 is moved inwardly with respect to the housing 40 with one hand while the other hand holds the extracting rod 10 in a position substantially parallel to the longitudinal axis of the drive shaft. As the lever 12 moves about the fulcrum formed by the spur 36 with the end of the drive shaft 38, the extracting rod engaging end 22 of the lever 12 acts to move the extracting rod 10 away from the housing 40, unseating the seal 70 from the housing and drawing the seal outwardly along the shaft until it is free. The entire operation can be performed in minimum time and with little effort on the part of the operator.

In FIG. 6 of the drawing, the device is shown being used to remove a seal from a transmission housing of the bell-type. The only adjustment required in utilizing the device in such an operation is the placement of the end 22 of the lever 12 in a notch 20 located a sufficient distance from the end of the drive shaft to enable the lever to be moved about its fulcrum in a manner to effect unseating and removal of the seal from the housing by the extracting rod 10. It can be seen from the foregoing that the adjustable features of the device invest it with unusual versatility as a seal remover or puller. In this connection, it should be understood that while the device of the present invention has been described in relation to its particular suitability for removing seals from transmission housings, it will be apparent to those skilled in the art that the device can be utilized to remove seals, rings and the like carried in a number of other mechanical constructions. It will be apparent also to those skilled in the art that changes may be made in details of construction and arrangement of parts of the embodiment of the device as described without departing from the spirit and scope of the present invention.

What is claimed is:

1. A device for removing the seal from a housing having a shaft sealed by the seal, comprising a seal extracting member having seal engaging means thereon, a lever member, fulcrum means carried by said lever member for engaging an end of the shaft, lever engaging means on said seal extracting member for receiving an end of said lever member and transmitting a force when force is applied to the opposite end of said lever member to the seal engaging means of the seal extracting member, and movable retaining means for said lever member in engagement with said seal extracting member for preventing the seal extracting member engaging end of the lever member from being disengaged from said lever engaging means of the seal extracting member when the lever member is moved about a fulcrum formed by the fulcrum means thereof and the shaft in removing the seal from the housing.

2. A device for removing the seal from a housing having a shaft sealed by the seal, comprising a seal extracting member having seal engaging means thereon, a lever member, adjustable fulcrum means carried by said lever member for engaging an end of the shaft, lever engaging means on said seal extracting member for receiving an end of said lever member and transmitting a force when force is applied to the opposite end of said lever member to the seal engaging means of the seal extracting member, and pivotal retaining means for said lever member in engagement with said seal extracting member for preventing the seal extracting member engaging end of the lever member from being disengaged from said lever engaging means of the seal extracting member when the lever member is moved about the fulcrum formed by the fulcrum means thereof and the shaft in removing the seal from the housing.

3. A device for removing the seal from a housing having a shaft sealed by the seal, comprising a seal extracting member having seal engaging means thereon, a lever member, fulcrum means carried by said lever member for engaging an end of the shaft, a plurality of longitudinally spaced notches in said seal extracting member for receiving one end of said lever member to enable the lever to be selectively positioned an operational distance from the end of the shaft, each of said notches when in engagement with said one end of the lever enabling a force when force is applied to the opposite end of the lever to be transmitted to the seal extracting member in a direction to effect removal of the seal from the housing, and retaining means for said lever member in engagement with said seal extracting member for preventing the said one end of the lever from being disengaged from any selected one of said notches when the lever is moved about the fulcrum formed by the fulcrum means thereof and the shaft in removing the seal from the housing.

4. A device having utility for removing the seals from the housing of automobile transmissions comprising, an elongated seal extracting rod, a seal engaging hook carried at one end of said rod, a lever freely movable longitudinally with respect to said extracting rod, a fulcrum member carried in a longitudinally extending slot in said lever and adjustable in said slot, a plurality of longitudinally spaced notches in said extracting rod on the side thereof opposite to that on which said hook is carried for receiving one end of said lever to enable the lever to be selectedly positioned an operational distance from the work piece, each of said notches when in engagement with said one end of the lever enabling a force applied to the opposite end of the lever to be transmitted to the hook carried by the extracting rod in a direction to effect removal of a seal, and a retaining yoke pivotally mounted on the lever and engaging the extracting rod to prevent said one end of the lever from being disengaged from any selected one of said notches when the lever is moved about its fulcrum.

References Cited by the Examiner

UNITED STATES PATENTS

| | | | |
|---|---|---|---|
| 1,356,979 | 10/1920 | Graves | 29—267 X |
| 1,372,389 | 3/1921 | Bailey | 29—267 X |
| 1,975,773 | 10/1934 | Davis | 29—267 X |
| 2,451,117 | 10/1948 | Price | 29—267 |
| 2,710,520 | 6/1955 | Selzler | 29—267 X |

WILLIAM FELDMAN, *Primary Examiner.*

MYRON C. KRUSE, *Examiner.*